March 18, 1952 J. M. MILLER, JR 2,589,723

NOISE SUPPRESSOR FOR AUDIO CIRCUITS

Filed Dec. 9, 1948 3 Sheets-Sheet 1

Inventor
JOHN M. MILLER, JR.

By Killman and Kerst
Attorney

Inventor
JOHN M.
MILLER, JR.

By Killman and Kerst
Attorney

March 18, 1952 J. M. MILLER, JR 2,589,723

NOISE SUPPRESSOR FOR AUDIO CIRCUITS

Filed Dec. 9, 1948 3 Sheets-Sheet 3

Inventor
JOHN M. MILLER, JR.

By Killman and Kerst
Attorney

Patented Mar. 18, 1952

2,589,723

UNITED STATES PATENT OFFICE 2,589,723

NOISE SUPPRESSOR FOR AUDIO CIRCUITS

John Milton Miller, Jr., Baltimore, Md., assignor to Bendix Aviation Corporation, Towson, Md., a corporation of Delaware Application December 9, 1948, Serial No. 64,345

16 Claims. (Cl. 178—44)

This invention relates to noise suppression circuits for audio frequency channels and has particular application to the suppressing of background noise in amplifying channels of phonograph reproducers.

Such noise is normally of a high audio frequency and is particularly objectionable during quiet passages of music or speech, being unnoticeable in the presence of a strong signal. It is in general not desirable that a suppressing action take place when the signal contains high frequency components of the order of magnitude of the noise, since suppression of the noise frequency distorts and debases the signal. It is thus desirable that some means for rendering the suppressor inoperable under such circumstances be provided. It is also desirable that the suppressing action be inhibited at lower values of signal intensity when very little noise accompanies the signal.

Noise is also frequently encountered in such channels, near the lower end of the signal frequency spectrum, such as, for example the well known "turntable rumble." Low frequency noise is likewise more objectionable when not masked by signal components and the same considerations as to its suppression apply as in the case of high frequency noise.

In previous attacks on this problem means have been provided for disabling the suppressing means in the presence of noise frequency signal components above a predetermined minimum intensity. Means have also been provided for manually varying the minimum signal level at which the suppressor is disabled.

It is apparent, however, that the use of manual means for this purpose is but a poor approximation to a satisfactory control of the disabling point of the suppressor means. Its use is a matter of trial and error. No advance criterion of the proper setting for a particular record is possible unless the operator knows or has recorded such a setting from experience. Even then a satisfactory setting for a complete composition is not possible because of changes in the intensity of various portions of the recorded material, and any chosen setting must be a compromise.

Furthermore, signal intensity alone is not a sufficient criterion for the suppressing action since suppression should be a function of the nature and intensity of the noise accompanying the signal.

It is an object of this invention to provide in a noise suppressing circuit, means automatically controlling the suppression of high or low signal frequencies as a function of the intensity of the noise accompanying the signal in frequency bands adjacent the suppressed frequencies.

It is a further object of this invention to provide in a noise suppressor circuit means for automatically controlling the point of disablement of the suppressor as a function of the intensity of frequency components of the noise which lie beyond the limits of the useful frequency spectrum of the signal.

It is another object of the invention to provide in a noise suppressing circuit means utilizing the frequency components of the noise which lie beyond such limits to control the disabling point of the suppressor means.

The objects and advantages of the invention are realized by a circuit which utilizes the space discharge path of a vacuum tube as a reactive or resistive shunt to ground capable of passing the noise frequencies accompanying the signal. The tube is biased to cut off by signals exceeding a predetermined intensity. Additional means is provided rectifying the chosen band of noise frequencies and utilizing the resulting voltage to oppose the action of the signal derived biasing voltage, or to reduce its magnitude relative to the signal from which it is derived. The result is to vary the disabling point of the reactance or resistance tube in terms of signal intensity as a function of the accompanying noise, a greater signal intensity being required for cut-off of the tube when the noise content is high, than is required when the noise content is low.

Other objects and advantages of the invention will become apparent upon a consideration of the following specification taken together with the accompanying drawing, in which.

Figure 1:
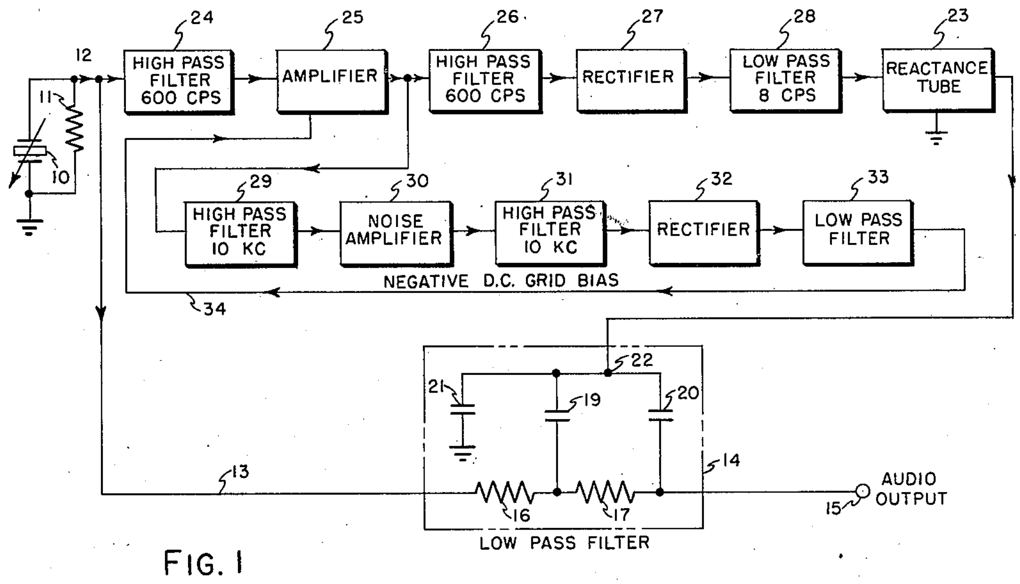
Fig. 1 is a block diagram of a noise suppressing circuit embodying the invention and utilizing very high frequency components of the noise.

Referring now more particularly to the drawing, there is shown in Fig. 1 a crystal phonograph pickup 10 shunted by a loading resistor 11 to control the low frequency response of the pickup.

The output of the pickup is, at the point 12, applied to a conductor 13 interrupted by a low pass filter 14 and terminating in an output terminal 15, from whence the audio output of the channel is taken.

The low-pass filter 14 is shown by way of example as comprising a pair of serially connected resistors 16 and 17. The terminals of resistor 17 are connected to ground by way of a parallel circuit comprising two condensers 19 and 20 in series with a condenser 21. The junction point 22 of condensers 19 and 20 is further connected to ground by way of the space discharge path of a reactance tube which is represented by block 23.

When the reactance tube 23 is cut off the filter 14 will pass frequencies throughout the response range of the pickup. When the reactance tube is fully conductive the point 22 is virtually grounded and the upper limit of the filter is reduced as desired; to 1500 C. P. S. for example.

Bias voltage for the control of the conductivity of the reactance tube is generated in the following manner:

The output of the pickup 10 is applied at the point 12 to a high pass filter 24 which passes frequencies above 600 C. P. S. to an amplifier 25. The output of amplifier 25 is filtered by high pass filter 26, rectified in rectifier 27, filtered by low pass filter 28, and applied as bias voltage to the reactance tube 23.

By the operation of the circuit so far described control of the reactance tube is a function of the intensity of the higher frequency components of the signal. The bias generated is sufficient to cut off the tube at a fixed threshold which is substantially independent of the noise content of the signal.

In accordance with the invention, however, means are provided for modifying the effect of signal amplitude in the control of the reactance tube. This is accomplished by applying the output of the amplifier 25 to a high pass filter 29 which passes only very high frequency components of the noise and signal. These components lie substantially entirely beyond the useful frequency spectrum of the audio signal.

The term "useful frequency spectrum" as it is used throughout the specification and claims is intended to identify that portion of the frequency spectrum in which, in a noisy record, signal components predominate in intensity over the noise components present, thus rendering it useful for the reproduction of intelligence.

The frequencies passed may be confined to those in a band centered at 10 kc. as indicated. In the case of a noisy record the energy at this frequency level provides a reliable indication of the total noise present. The energy passed is amplified in noise amplifier 30, passed through a second high pass filter 31 similar to 29, rectified in rectifier 32, smoothed in a low pass filter 33 and applied by way of a conductor 34 to the amplifier 25 as negative D. C. grid bias.

The application of this noise derived bias voltage to the amplifier 25 has the effect of increasing the signal intensity necessary to cut off the reactance tube as the intensity of the accompanying noise increases. Stated in another fashion, during passages with little noise, noise suppression will rapidly become less effective as the signal intensity increases and will be completely inhibited during signals of moderate intensity, but with a high noise content noise suppression will not disappear completely except during very intense signal levels. Thus for any condition of noisiness, the suppression of noise will be eliminated as the signal reaches a level sufficient to mask it.

Figure 2:
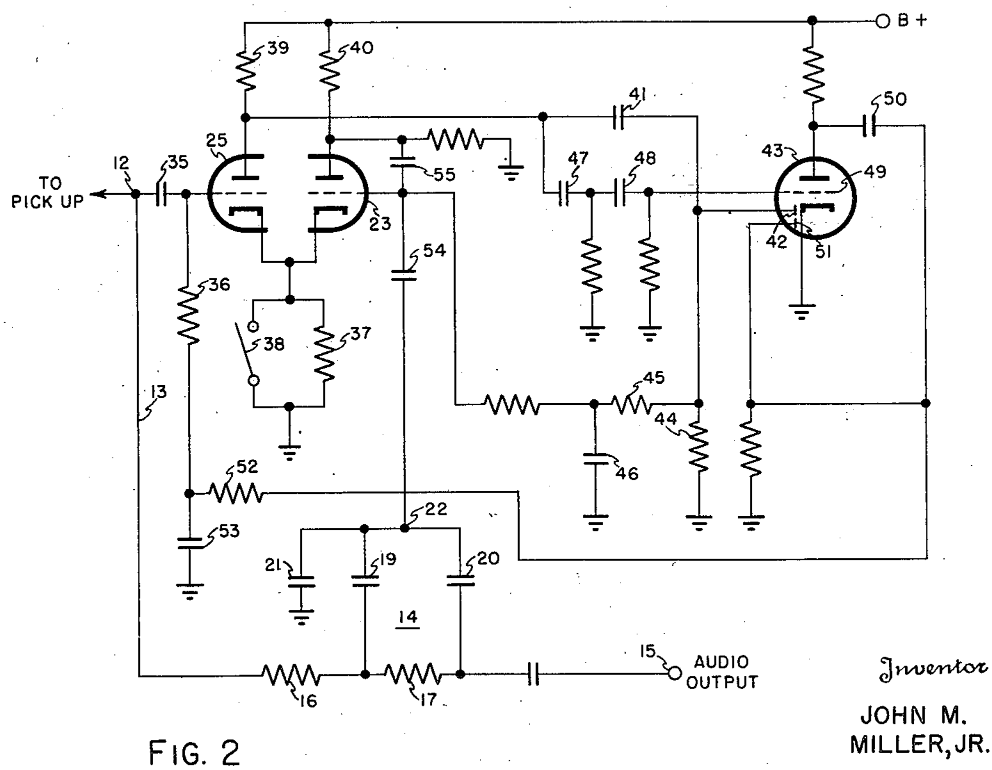
Fig. 2 is a schematic diagram of the circuit of Fig. 1.

In Fig. 2 there is schematically shown a circuit which corresponds to the block diagram of Fig. 1.

The output of the pickup is applied at point 12, both to the conductor 13 which is interrupted by filter 14 and terminates in audio output terminal 15, and to the control grid of amplifier 25 by way of a high pass filter corresponding to filter 24 of Fig. 1 and constituted by condenser 35 and resistor 36.

The amplifier tube 25 and reactance tube 23 are shown as portions of a twin triode. The cathodes are tied together and connected to ground through a resistor 37. A short circuiting connection is provided around the resistor 37, being interrupted by a switch 38 which is closed when operation of the noise suppressor is desired. The anodes of the two tubes are connected to a plate voltage source by way of load resistors 39 and 40 respectively.

The output of amplifier 25 is applied by way of condenser 41, which has a capacitance of such value as to pass only the high signal frequencies, to the diode anode 42 of the double diode-triode tube 43. The output of the diode, taken across the load resistor 44, is applied by way of a low pass filter consisting of resistor 45 and condenser 46 to the control grid of the reactance tube 23 where it acts as negative biasing voltage. The elements just described correspond to blocks 26, 27 and 28 of Fig. 1.

The output of amplifier 25 is also applied, by way of condensers 47 and 48, to the grid 49 of the triode section of tube 43. The capacitance of condenser 47 is so small that only the very high frequency components of the output of amplifier 25, which lie above the useful frequency spectrum of the signal, are passed. These, in a noisy record, consist almost entirely of noise components. This voltage is amplified in the triode section of tube 43 and applied by way of condenser 50 to the anode 51 of the remaining diode section of tube 43. The condenser 50 is made small enough so that it constitutes a second high pass filter for the noise voltage. The rectified voltage is applied through resistors 52 and 36 to the control grid of amplifier 25. The resistor 52 and condenser 53 constitute a low pass filter for this voltage. The point 22 of filter 14 is coupled to the anode of reactance tube 23 by means of condensers 54 and 55.

Figure 3:
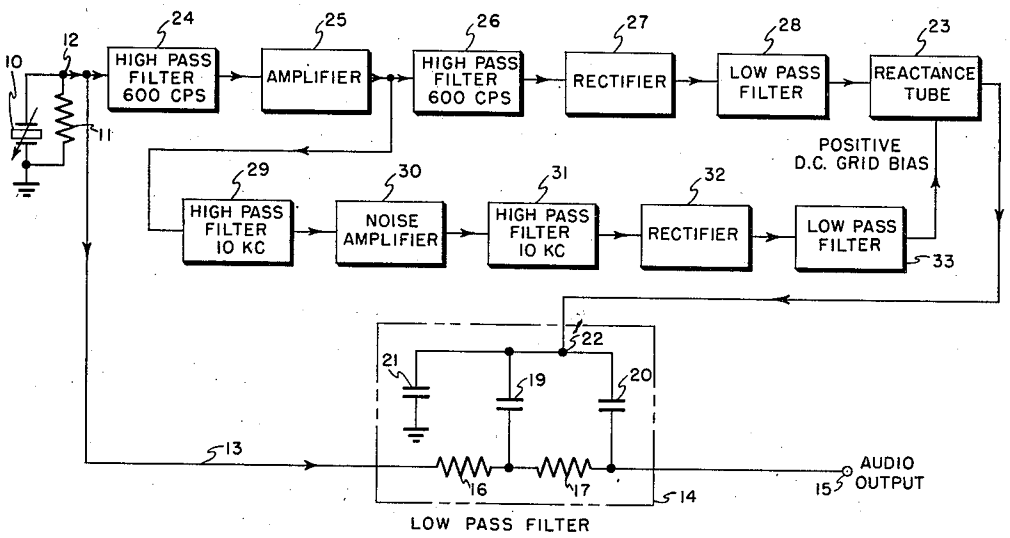
Fig. 3 is a block diagram of a modification of the circuit of Fig. 1.
Figure 4:
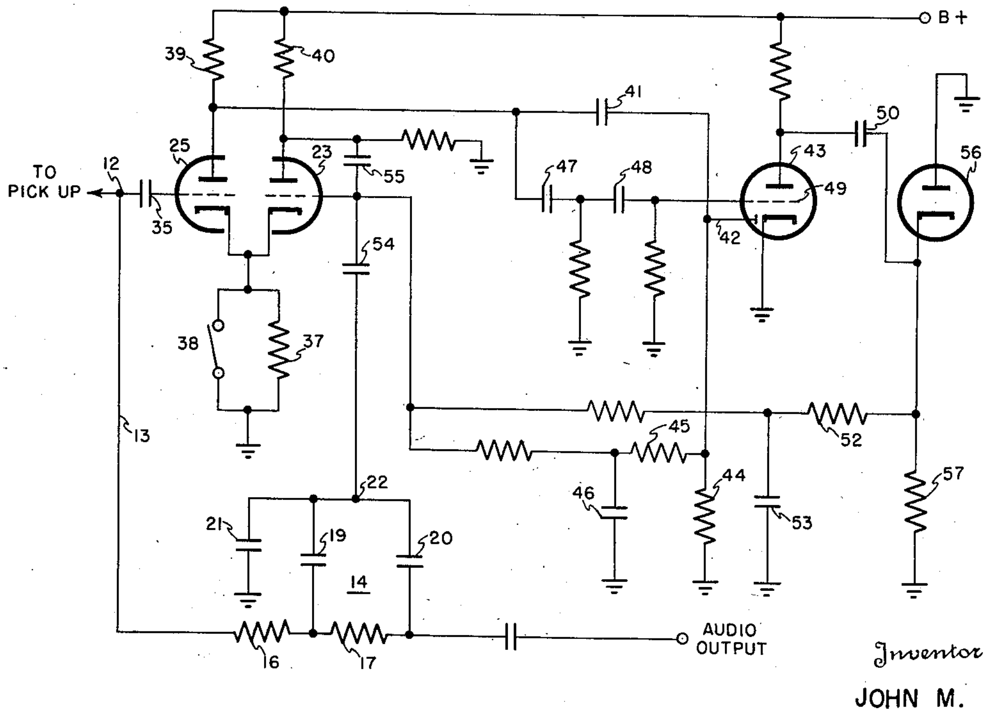
Fig. 4 is a schematic diagram of the circuit of Fig. 3.

The circuit of Figs. 3 and 4 is in general the same as that of Figs. 1 and 2, except that positive D. C. bias voltage is derived from the rectification of noise voltage and is applied to the reactance tube to oppose the negative bias derived from the signal.

It will be noted in Fig. 4 that the output of the triode section of tube 43 is applied to the cathode of a separate rectifier 56. Rectified voltage is taken across a load resistor 57 and applied through filter network 52, 53 to the grid of reactance tube 23. In other respects this circuit is the same as that shown in Fig. 2.

Figure 5:
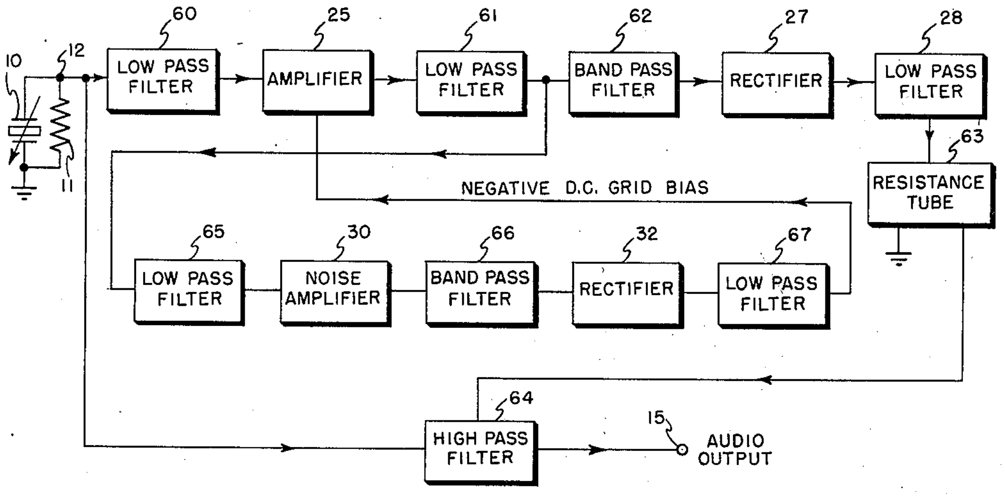
Fig. 5 is a block diagram of a circuit similar to that of Fig. 1 but utilizing low noise frequencies to control the threshold of disablement of noise suppression.
Figure 6:
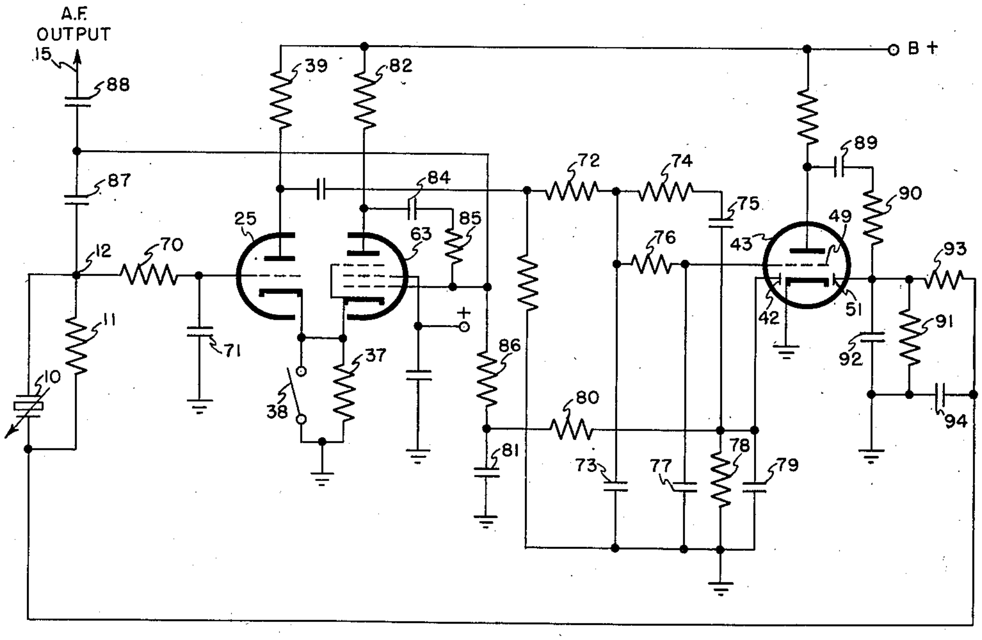
Fig. 6 is a schematic diagram of the circuit of Fig. 5.

The circuit of Figs. 5 and 6 illustrates an embodiment of the invention in which the low frequencies traversing the audio channel are suppressed.

The circuit of Fig. 5 is a block diagram similar to those of Figs. 1 and 3. In this circuit the output of the crystal pickup 10 is applied to a low pass filter 60 and thence to amplifier 25. The output of this amplifier is applied by way of low pass filter 61 and band pass filter 62 to rectifier 27, the output of which is filtered in low pass filter 28 and applied as bias voltage to a resistance tube 63.

The audio translation channel fed by the crystal pickup 10 includes a high pass filter 64 which is connected to the resistance tube 63 in a manner to use the variable input resistance thereof as a shunt for the low frequency components of the channel. When the resistance tube is not conducting its input resistance is high and the low frequencies are not curtailed. When the resistance tube conducts its input resistance is greatly reduced and the low frequencies of the channel are removed.

The portion of the circuit so far described establishes a noise suppressing action having a definite threshold in terms of signal amplitude. In order to make the threshold a function likewise of the amount of low frequency noise present in the channel the output of the low pass filter 62 is applied to a low pass filter 65 which is arranged to pass only frequencies lower than the lower limit of the useful signal frequency spectrum. The energy passed thereby thus during the playing of a noisy record consists predominantly of noise. This is amplified in noise amplifier 30, put through a band pass filter 66, rectified in rectifier 32 and applied by way of low pass filter 67 to the amplifier 25 as negative D. C. grid bias. The threshold of noise suppression in terms of signal amplitude is thus made variable as an inverse function of the amount of noise present.

In Fig. 6 the low pass filter 60 is composed of resistor 70 and shunting condenser 71. The resistance tube 63 is a pentode connected in the circuit in the place of tube 23 of the previous embodiments. The output of amplifier 25 is applied by way of the low pass filter composed of resistance 72 and condenser 73 and band pass filter constituted by resistance 72, condenser 73, resistance 74, condenser 75, resistance 78 and condenser 79, to the anode 42 which constitutes, with the cathode of the tube 43, the rectifier 27 of Fig. 5. The low pass and band pass filters just described are the filters 61 and 62 of that figure. The resistor 80 and condenser 81 constitute the low pass filter 28 of Fig. 5 through which the output of the rectifier 27 is applied to the control grid of the tube 63 as negative grid bias.

The tube 63 has its anode connected to a source of plate supply voltage through a resistor 82. A connection is provided between the anode and the control grid by way of a condenser 84 and a resistor 85. The control grid is connected to ground by way of a resistor 86 and the condenser 81. The audio output terminal 15 is connected to the point twelve by the filter 64 of Fig. 5 which is composed of condensers 87 and 88. The junction of these condensers is connected directly to the control grid of the tube 63.

The condenser 84 is of a value so selected that that it operates merely as a blocking condenser. Resistances 82, 85 and 86 are selected to present a high resistance to the filter 64 in the absence of conduction in tube 63. However, when conduction occurs the resistance seen by the filter is greatly reduced due to the application of the anode potential of the tube 63 across the resistor 85 in phase opposition to the input voltage.

As so far described the circuit of Fig. 6 provides a threshold for the removal of noise suppression which depends entirely on signal amplitude. In order to vary this threshold as a function of the amount of noise accompanying the signal, a portion of the output of amplifier 25 is tapped off between low pass filter 61 and band pass filter 62 and applied by way of low pass filter 65 composed of resistor 76 and condenser 77 to the control grid 49 of tube 43. The components of the low pass filter 65 are so selected as to pass only the noise components lying beyond the lower end of the signal spectrum. These are amplified by the triode section of tube 43 and applied by way of condenser 89 and resistor 90 to the anode 51 of the tube 43. This anode forms with the cathode of the tube a rectifier the circuit of which is completed through resistor 90 across capacitor 92. The voltage developed across this capacitor is applied, by way of low pass filter 67 composed of resistor 93 and capacitor 94, to the control grid of amplifier 25 as negative grid bias. The application of this bias thus lowers the output of amplifier 25 during the presence of substantial noise energy as measured by the portion of its spectrum below the useful signal spectrum. This operates to raise the threshold, in terms of signal amplitude, at which noise suppression is inhibited.

What is claimed is:

1. In combination, a translating channel for audio frequency signals, means coupled to said channel for attenuating a band of frequencies lying within and adjacent to one of the limits of the useful frequency range of said signals, while permitting translation of frequencies lying within the remainder of said useful frequency range, means responsive to the presence in said channel of energy of high intensity lying within said band for reducing said attenuation and means responsive to the presence in said channel of energy having a frequency outside said limit to diminish the effect of said attenuation reducing means.

2. In combination, a translating channel for audio frequency signals, means coupled to said channel for attenuating a band of frequencies lying within and adjacent to one of the limits of the useful frequency range of said signals, while permitting translation of frequencies lying within the remainder of said frequency range, means progressively reducing said attenuation as the intensity of high frequency energy in said channel increases, and means opposing the action of said attenuation reducing means in direct proportion to the intensity of energy present in said channel and lying within a frequency range outside said limit.

3. In combination, a translating channel for audio frequency signals, means coupled to said channel for attenuating a band of frequencies lying within and adjacent to one of the limits of the useful frequency range of said signals, while permitting translation of frequencies lying within the remainder of said frequency range, means progressively reducing said attenuation as the itensity of energy lying within said band increases and means diminishing the effect of said attenuation reducing means, for a given intensity of energy in said channel lying within said band, as a function of the intensity of the energy present in said channel having a frequency outside said limit.

4. In combination, a translating channel for audio frequency signals, means coupled to said channel for attenuating the high audio frequency portions of said signals while permitting translation of the lower audio frequency portions thereof, means responsive to the presence of intense high audio frequency energy in said channel for reducing the attenuation of said high frequency portions of said signal, and means responsive to the presence in said channel of energy within a frequency range above that of the upper useful frequency limit of said signals to oppose the action of said attenuation reducing means.

5. In combination, a translating channel for audio frequency signals, means coupled to said channel for attenuating the high audio frequency portions of said signals while permitting translation of the lower audio frequency portions thereof, means progressively reducing said attenuation as the intensity of high frequency energy in said channel increases, and means opposing the action of said attenuation reducing means in direct proportion to the intensity of the energy present in said channel lying within a frequency range above that of the upper useful frequency limit of said signals.

6. In combination, a translating channel for audio frequency signals, means coupled to said channel for attenuating the high audio frequency components of said signals while permitting translation of the lower audio frequency components thereof, said means comprising means shunting said high audio frequency components across said channel, means responsive to the presence of intense high audio frequency energy in said channel for decreasing the conductivity of said shunt, and means responsive to the presence in said channel of energy within a frequency range above that of the upper useful frequency limit of said signals to oppose the action of said conductivity decreasing means.

7. In combination, a translating channel for audio frequency signals, means constituting a path conductive to high audio frequency components of said signals and substantially non-conductive to low audio frequency components of said signals said means being coupled to said channel, means responsive to the presence of high audio frequency components at the input to said channel to reduce the conductivity of said path as a function of the intensity thereof, and means responsive to the presence at the input of said channel of energy within a frequency range above that of the upper useful frequency limit of said signals to increase the conductivity of said path as a function of the intensity thereof.

8. In combination, a translating channel for audio frequency signals, attenuating means including the space discharge path of an electron discharge tube, said means being coupled to said channel and being conductive to high audio frequency components of said signals but substantially non-conductive to low audio frequency components of said signals, means deriving from high audio frequency energy present at the input to said channel a negative direct current voltage and applying said voltage as bias to said electron discharge tube, means deriving from energy present at the input to said channel and lying within a frequency range above that of the upper useful frequency limit of said signals a direct current voltage, and means utilizing the last named voltage to decrease the magnitude of said bias voltage.

9. In combination, a translating channel for audio frequency signals, attenuating means connected across said channel and constituting a path conductive to high audio frequency components of said signals and substantially non-conductive to low audio frequency components of said signals, said means including the space discharge path of an electron discharge tube, means rectifying high audio frequency energy present in the input to said channel and applying the resultant voltage as bias voltage to said electron discharge tube, means rectifying energy present at the input of said channel and lying within a frequency range above that of the upper useful frequency limit of said signals and means utilizing the resultant voltage to vary the bias of said discharge tube in a positive sense.

10. In combination, a translating channel for audio frequency signals, a frequency selective network coupled to said channel and so arranged as to attenuate high audio frequency components of the energy present in said channel, said network including the space discharge path of an electron discharge tube, the conductivity of said path determining the attenuating effect of said network upon the high audio frequency components of said signals in said channel, an amplifier, means applying high audio frequency components of the energy present at the input of said channel to said amplifier, means rectifying the output of said amplifier and deriving therefrom a negative direct current voltage, means applying said negative voltage as biasing voltage to said electron discharge tube, means rectifying frequency components of the output of said amplifier lying beyond the upper limits of the useful frequency range of said signals and deriving therefrom a negative direct current voltage and means applying the last named negative voltage as biasing voltage to said amplifier.

11. In combination, a translating channel for audio frequency signals, a frequency selective network coupled to said channel and so arranged as to attenuate high audio frequency components of the energy present in said channel, said network including the space discharge path of an electron discharge tube, the conductivity of said path determining the attenuating effect of said network upon the high audio frequency components of said signals in said channel, an amplifier, means applying high audio frequency components of the energy present at the input of said channel to said amplifier, means rectifying the output of said amplifier and deriving therefrom a negative direct current voltage, means applying said negative voltage as biasing voltage to said electron discharge tube, means rectifying frequency components of the output of said amplifier lying beyond the upper limits of the useful frequency range of said signals and deriving therefrom a positive direct current voltage and means applying the last named positive voltage as biasing voltage to said electron discharge tube.

12. In combination, a translating channel for audio frequency signals, attenuating means including the space discharge path of an electron discharge tube, said means being coupled to said channel and being conductive to high audio frequency components of said signals but substantially non-conductive to low audio frequency components of said signals, means deriving from high audio frequency energy present at the input to said channel a negative direct current voltage and applying said voltage as bias to said electron discharge tube, means deriving a direct current voltage from energy present at the input to said channel having a frequency higher than that of said high frequency components of said signals and means utilizing the last named voltage to diminish the magnitude of negative bias on said electron discharge tube for any given intensity of high frequency energy in said channel.

13. In combination, a translating channel for audio frequency signals, means coupled to said channel for attenuating the high audio frequency portions of said signals while permitting translation of the lower audio frequency portions thereof, means progressively reducing said attenuation as the intensity of high frequency energy in said channel increases and means diminishing the effect of said attenuation reducing means for a given intensity of high frequency energy in said channel as a function of the intensity of the noise present in said channel having a frequency higher than said high frequency portions of said signals.

14. In combination, a translating channel for audio frequency signals, means coupled to said channel for attenuating the low audio frequency portions of said signals while permitting translation of the higher audio frequency portions thereof, means responsive to the presence of intense low audio frequency energy in said channel for reducing the attenuation of said low frequency portions of said signal and means responsive to the presence in said channel of energy within a frequency range below that of the lower useful frequency limit of said signals to diminish the effect of said attenuation reducing means.

15. In combination, a translating channel for audio frequency signals, means coupled to said channel for attenuating the low audio frequency portions of said signals while permitting translation of the higher audio frequency portions thereof, means progressively reducing said attenuation as the intensity of low frequency energy in said channel increases, and means opposing the action of said attenuation reducing means in direct proportion to the intensity of energy present in said channel lying within a frequency range below that of the lower useful frequency limit of said signals.

16. In combination, a translating channel for audio frequency signals, means coupled to said channel for attenuating the low audio frequency components of said signals while permitting translation of the higher audio frequency components thereof, means progressively reducing said attenuation as the intensity of low frequency energy in said channel increases and means diminishing the effect of said attenuation reducing means for a given intensity of low frequency energy present in said channel as a function of the intensity of the energy present in said channel having a frequency lower than said low frequency portions of said signals.

JOHN M. MILLER, Jr.

REFERENCES CITED

The following references are of record in the file of this patent:

UNITED STATES PATENTS

| Number | Name | Date |
|---|---|---|
| 1,979,035 | Hammond | Oct. 30, 1934 |
| 2,112,595 | Farnham | Mar. 29, 1938 |
| 2,241,581 | Boucke | May 13, 1941 |